United States Patent

[11] 3,634,876

[72] Inventor John James Yorganjian
West Palm Beach, Fla.
[21] Appl. No. 65,861
[22] Filed Aug. 21, 1970
[45] Patented Jan. 11, 1972
[73] Assignee RCA Corporation

[54] SIGNAL DETECTING AND LATCHING CIRCUIT
2 Claims, 4 Drawing Figs.

[52] U.S. Cl. .................................................... 328/92, 307/208, 307/215, 307/218, 328/110
[51] Int. Cl. .................................................... H03k 19/24, H03k 19/30, H03k 19/34
[50] Field of Search .......................................... 307/208, 215, 218, 269, 272, 289; 328/92, 201, 206, 110

[56] References Cited

UNITED STATES PATENTS

| | | | |
|---|---|---|---|
| 2,835,828 | 5/1958 | Vogelsong | 307/208 |
| 2,748,269 | 5/1956 | Slutz | 307/218 X |
| 3,448,388 | 6/1969 | Krause | 307/215 X |

OTHER REFERENCES

Osseck & Weinberger, " Performing Logic with Latch Circuit," IBM Technical Disclosure Bulletin, Vol. 8, No. 6, p. 855, 11- 1965.

*Primary Examiner*—Donald D. Forrer
*Assistant Examiner*—L. N. Anagnos
*Attorney*—H. Christoffersen

ABSTRACT: A sense signal detecting and latching circuit is disclosed which can be coupled to the output of a differential sense amplifier to provide a memory data register. An enable pulse, having a leading edge occurring before a sense signal to be detected and having a trailing edge occuring at a predetermined time following the end of the sense signal, is applied to one input of a coincidence gate. A transformer has a primary winding coupled to output terminals of the differential sense amplifier and has one end of its secondary winding connected to another input of the coincidence gate. The other end of the secondary winding is connected to an output terminal of the coincidence gate having a polarity to provide positive feedback through the secondary winding to the input of the coincidence gate. The coincidence gate responds to a sense signal to provide an output signal which is maintained until the time of the end of the enable pulse.

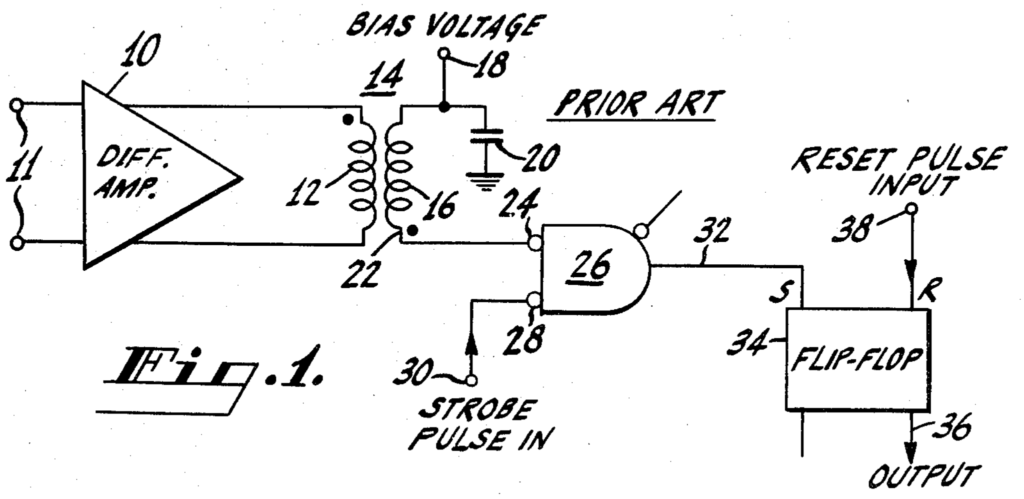
Fig. 1.
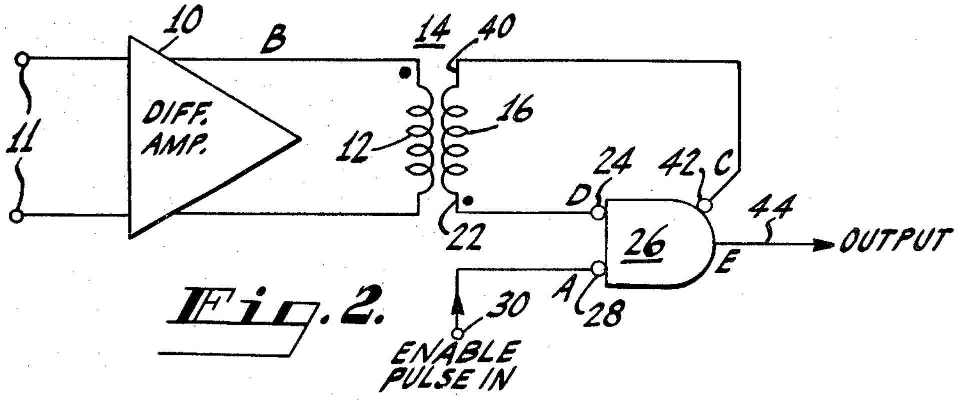
Fig. 2.
| D | A | C | E |
|---|---|---|---|
| H | L | H | L |
| L | H | H | L |
| H | H | H | L |
| L | L | L | H |
Fig. 4.
INVENTOR.
JOHN J. YORGANJIAN
BY
Carl V. Olson
Attorney INVENTOR.
JOHN J. YORGANJAN
BY Carl V. Olson
Attorney

SIGNAL DETECTING AND LATCHING CIRCUIT

BACKGROUND OF THE INVENTION

In magnetic core memories, magnetic tape stations, etc., small, short-duration sense signals are normally passed through amplifying means which is momentarily enabled when the sense signal is expected, and if the amplitude of the sense signal exceeds a predetermined threshold, the output of the amplifying means is employed to set a flip-flop in a memory data register. A flip-flop is employed because the information represented by the sense signal must be maintained for a sufficient length of time for the information to be utilized by a computer processor. It is an object of this invention to provide a simpler a more economical circuit means for accomplishing the functions of threshold detection of a short-duration input signal and maintaining the information for a predetermined period of time.

SUMMARY OF THE INVENTION

In accordance with the invention, a short-duration input signal is coupled to one input of a coincidence gate having a desired input signal threshold. An enabling pulse is applied to another input of the coincidence gate and has a duration extending from a time prior to the arrival of the peak of the input signal to a predetermined time thereafter. An output of the coincidence gate is coupled back to the input thereof in a manner to provide positive feedback and maintain the signal input to the gate from the time of arrival of the input signal until the end of the enabling pulse.

BRIEF DESCRIPTION OF THE DRAWING

FIG. 1 is a diagram of a prior art arrangement for detecting and maintaining the information represented by a narrow input pulse;

FIG. 2 is a diagram of an arrangement embodying the invention for accomplishing the same purposes as are accomplished by the arrangement of FIG. 1;

FIG. 4 is a truth table for the coincidence gate 26.

DESCRIPTION OF THE PREFERRED EMBODIMENT

Figure 3:
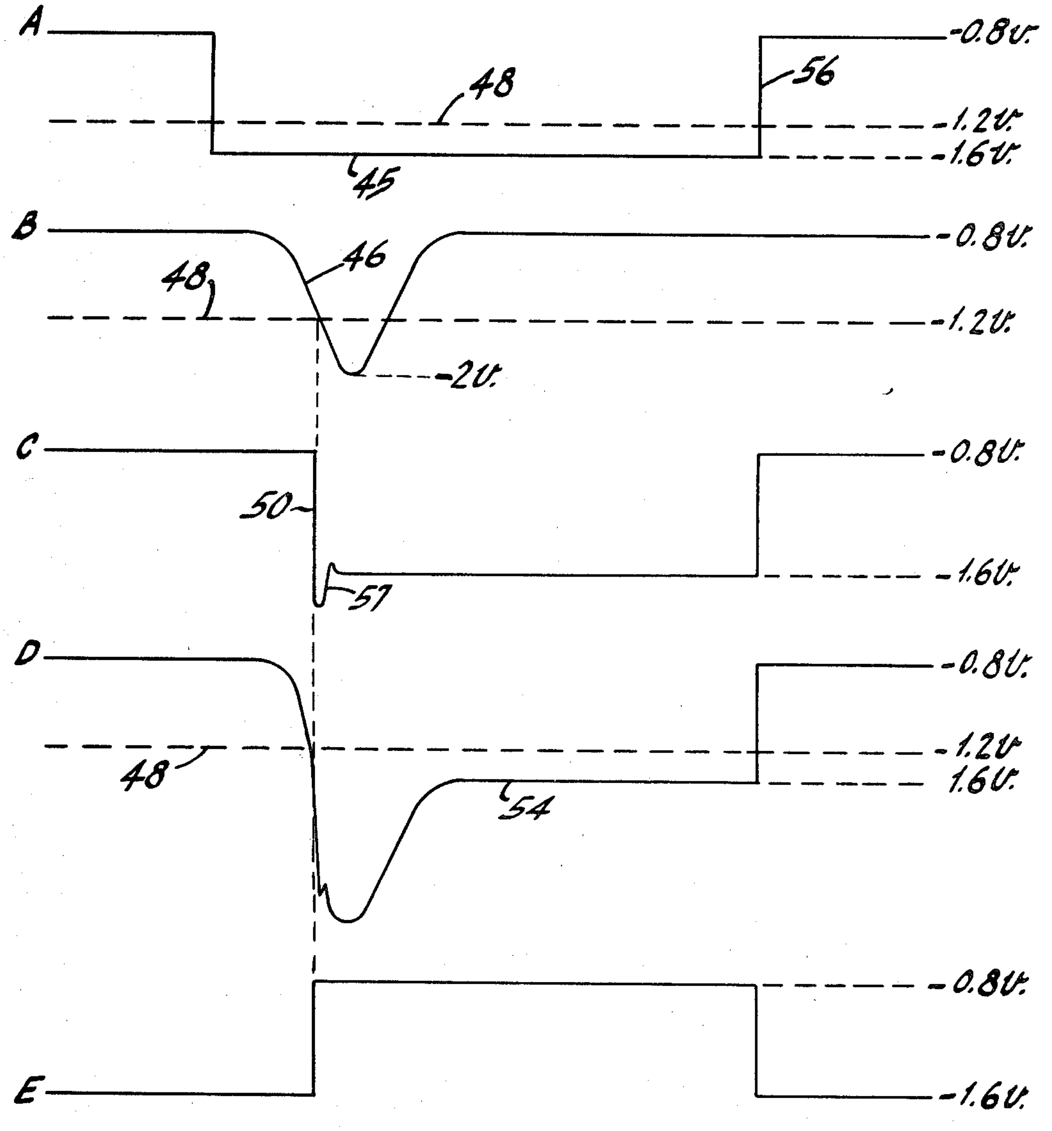
FIG. 3 is a chart of voltage waveforms which will be referred to in describing the operation of the system of FIG. 2.

Reference is now made to FIG. 1 which shows a prior art arrangement including a differential sense amplifier 10 having input terminals 11 connected to a sense line in a magnetic core memory (not shown). The differential signal output from the amplifier 10 is connected to the terminals of a primary winding 12 of a pulse transformer 14. The transformer includes a secondary coil 16 having one terminal connected to a source 18 of bias potential and to a filter capacitor 20 having its other terminal grounded. The other terminal 22 of secondary coil 16 is connected to a signal input 24 of a conventional coincidence gate 26. Gate 26 also has an enabling or strobe pulse input terminal 28 which is connected to the output terminal 30 of a source of strobe pulses (not shown).

The output 32 from coincidence gate 26 is connected to the set input S of a flip-flop 34. The flip-flop has an output terminal 36 from which information stored in the flip-flop is available until such time as the flip-flop is reset by a reset pulse applied from a source (not shown) having a terminal 38 to the reset terminal R.

In the operation of the prior art arrangement shown in FIG. 1, a short-duration sense signal from the differential amplifier 10 is coupled through the transformer 14 to the signal input terminal 24 of coincidence gate 26. At the time when a sense signal is expected, the gate 26 is enabled by a strobe pulse applied to the other input terminal 28 of the gate. If the sense signal applied to input terminal 24 exceeds the input threshold of gate 26, its coincidence with the strobe input results in an output pulse on line 32 which is operative to set the flip-flop 34. The output 36 of the flip-flop maintains a representation of the stored information until the flip-flop is reset by a reset pulse.

FIG. 2 shows a system embodying the invention which is much simpler than the system of FIG. 1, and yet performs all of the functions of the system of FIG. 1. In FIG. 2, the differential amplifier 10 has differential signal input terminals 11, and differential signal output terminals connected to the ends of the primary winding 12 of pulse transformer 14. One end 22 of the secondary winding 16 of transformer 14 is connected to the signal input terminal 24 of coincidence gate 26. The gate 26 also has an enabling input terminal 28. The transformer windings may be provided with series and shunt resistors to compensate for imperfections in the transformer characteristics. As thus far described, the system of FIG. 2 is the same as the system of FIG. 1, and the same reference numerals have been employed. The coincidence gate 26 operates in accordance with the truth table shown in FIG. 4, and, of course, may be replaced by a functionally similar gate employing different polarities of inputs and outputs.

The other end 40 of secondary winding 16 is connected to a noninverting output 42 of the coincidence gate 26. The polarity of the connection from the noninverting output 42 to the secondary coil 16 is such as to provide a positive feedback coupling from the output 42 of the gate to the input 24 of the gate. The gate 26 also includes an inverting output 44.

The operation of the system of FIG. 2 will now be described with references to the waveforms shown in FIG. 3 wherein the high, low and threshold voltage levels shown are the levels used by a large family of emitter-coupled current logic gates variously designated ECCL, ECSL, MECL, etc., by several manufacturers. The high level H is −0.8 volts, the low level L is −1.6 volts, and the intermediate threshold voltage is −1.2 volts. An enabling or priming pulse is applied from terminal 30 to the enabling input 28 of gate 26. The enabling pulse 45, as shown in idealized form in FIG. 3A, has a duration extending from a time prior to the time when the peak of an input sense signal is expected, to a following predetermined time allowing a sufficient interval for the retained information to be utilized.

FIG. 3B represents an input sense signal 46 as coupled from the amplifier 10 and through the transformer 14 to the signal input terminal 24 of coincidence gate 26. When input signal 46 exceeds the input threshold 48 of gate 26 (becomes more negative than the threshold 48), the gate, which is already enabled by the enabling pulse 45 at input 28, produces an output transition 50 as shown in idealized form by waveform C at its noninverting output terminal 42. The output C is coupled back through the secondary winding 16 to the signal input terminal 24 in a polarity providing positive feedback. The original signal, and the feedback signal, add together to provide the waveform D in FIG. 3. It is seen that the feedback portion 54 of waveform D exceeds the input threshold 48 at the signal input terminal 24 so long as the enabling pulse of waveform A is present. At the end 56 of the enabling pulse of waveform A, the gate is disabled and the noninverted output C from terminal 42 of the gate returns to its normal value, as does the inverted output E from output terminal 44. It is therefor seen that the inverted output 44 as shown by waveform E starts when the input signal 46 exceeds threshold 48, and continues until the end 56 of the enabling pulse 45. The inverted output E is free of the transient disturbance 57 present in waveform C.

The signal detecting and latching circuit of FIG. 2 is simpler than the prior art circuit of FIG. 1 in that is does not require the bias voltage source 18 and the capacitor 20, in that it does not require the flip-flop 34, and in that it does not require the flip-flop 34, and in that it does no require a source of reset pulses for application to the reset input of the flip-flop. In addition to being simpler, the arrangement of FIG. 2 is faster in operation because there are fewer stages through which the signal must be propagated before reaching the output terminal. In an actual embodiment of the arrangement of FIG. 2, an output signal followed an input signal in approximately 8 nanoseconds, as compared with a delay of 25 nanoseconds in a system according to FIG. 1. The arrangement of FIG. 2 is also advantageous in being sensitive to input signals of smaller amplitude than those needed to operate the system of FIG. 1.

What is claimed is:

1. A signal detecting and latching circuit, comprising a coincidence gate having two input terminals and at least one output terminal, means to apply an enable pulse to one input of said gate, said enable pulse having a leading edge occurring before the peak of an input signal to be detected and having a trailing edge occurring at a predetermined time following the end of said input signal, a transformer having primary winding receptive to said input signal and having a secondary winding, means to couple one end of said secondary winding to the other input terminal of said gate, and means to couple an output of said gate to the other end of said secondary winding and therethrough to said other input of said gate in a polarity to provide positive feedback, whereby said coincidence gate responds to an input signal to provide an output signal which is maintained until the time of the end of said enable pulse.

2. In a magnetic memory, a sense signal detecting and latching circuit coupled to a differential sense amplifier to provide a memory data register, comprising a coincidence gate having two input terminals and at least one output terminal, means to apply an enable pulse to one input of said gate, said enable pulse having a leading edge occurring before the peak of a sense signal to be detected and having a trailing edge occurring at a predetermined time following the end of said sense signal, a transformer having a primary winding coupled to output terminals of said differential sense amplifier and having a secondary winding, means coupling one end of said secondary winding to the other input terminal of said coincidence gate, and means coupling the output terminal of said coincidence gate to the other end of said secondary winding in a polarity to provide positive feedback through the secondary winding to the input of the coincidence gate, whereby said coincidence gate responds to a sense signal to provide an output signal which is maintained until the time of the end of said enable pulse.

* * * * *